Dec. 19, 1933.  F. H. WAGNER  1,940,197
GAS CLEANER
Filed July 1, 1931   4 Sheets-Sheet 1
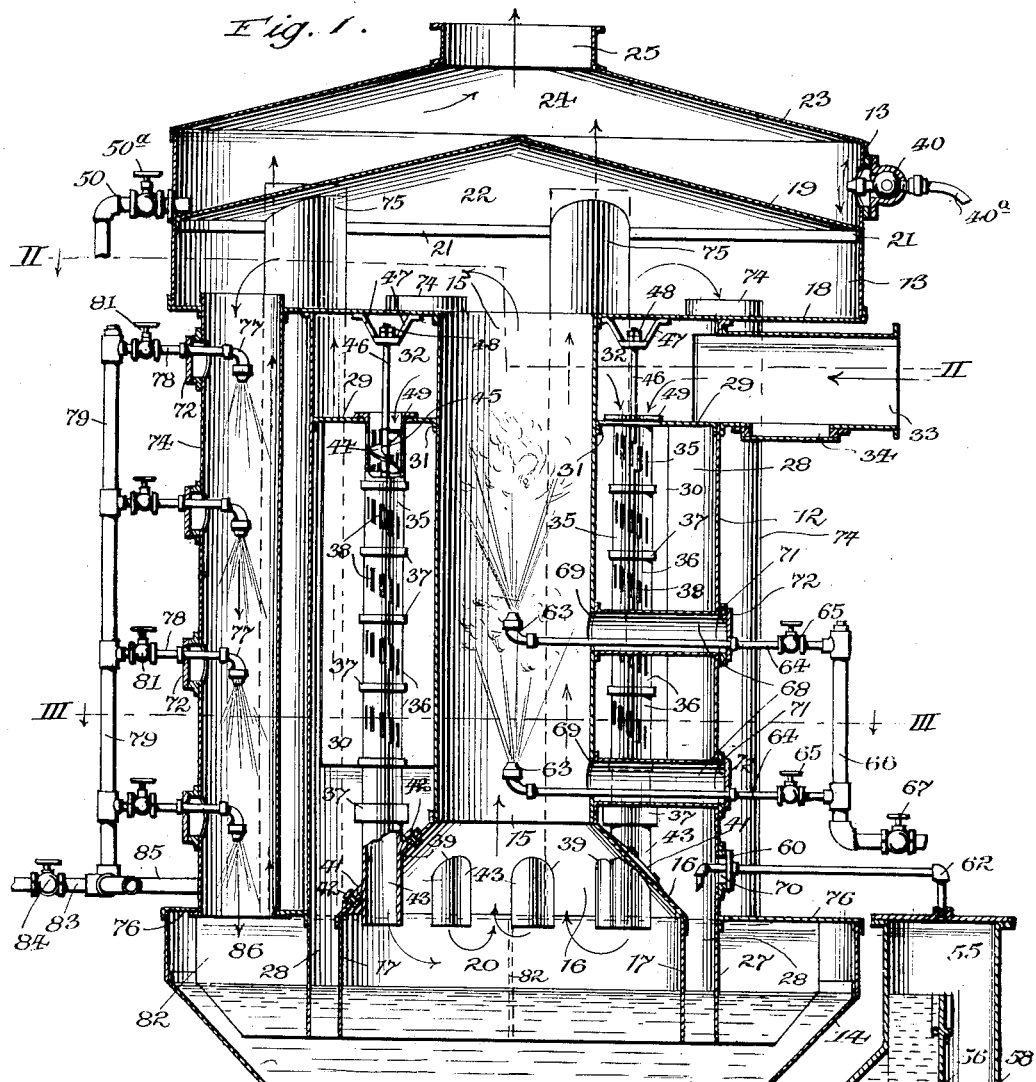
Inventor:
Frederick H. Wagner
By
Attorneys.

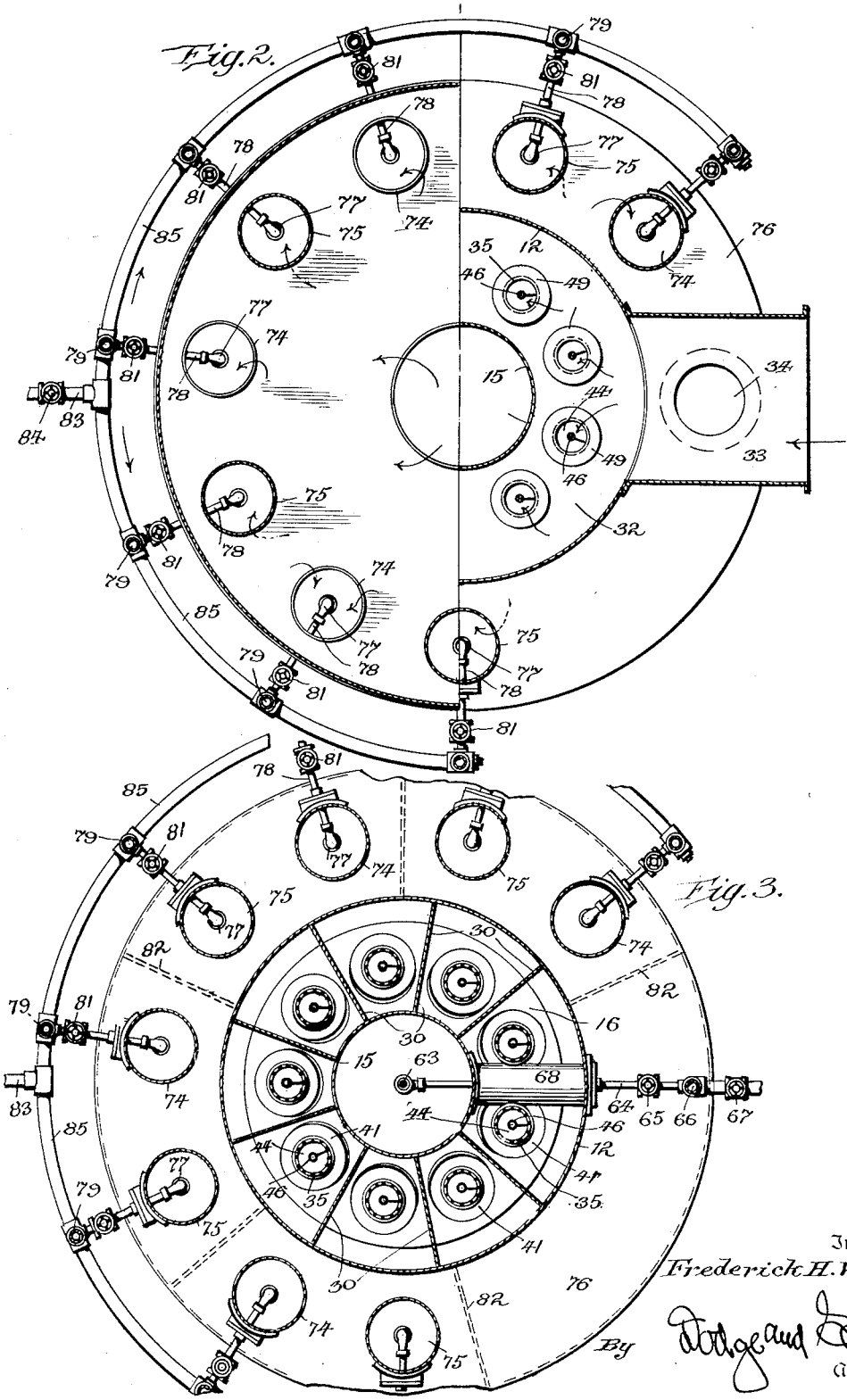

Dec. 19, 1933.   F. H. WAGNER   1,940,197
GAS CLEANER
Filed July 1, 1931    4 Sheets-Sheet 3
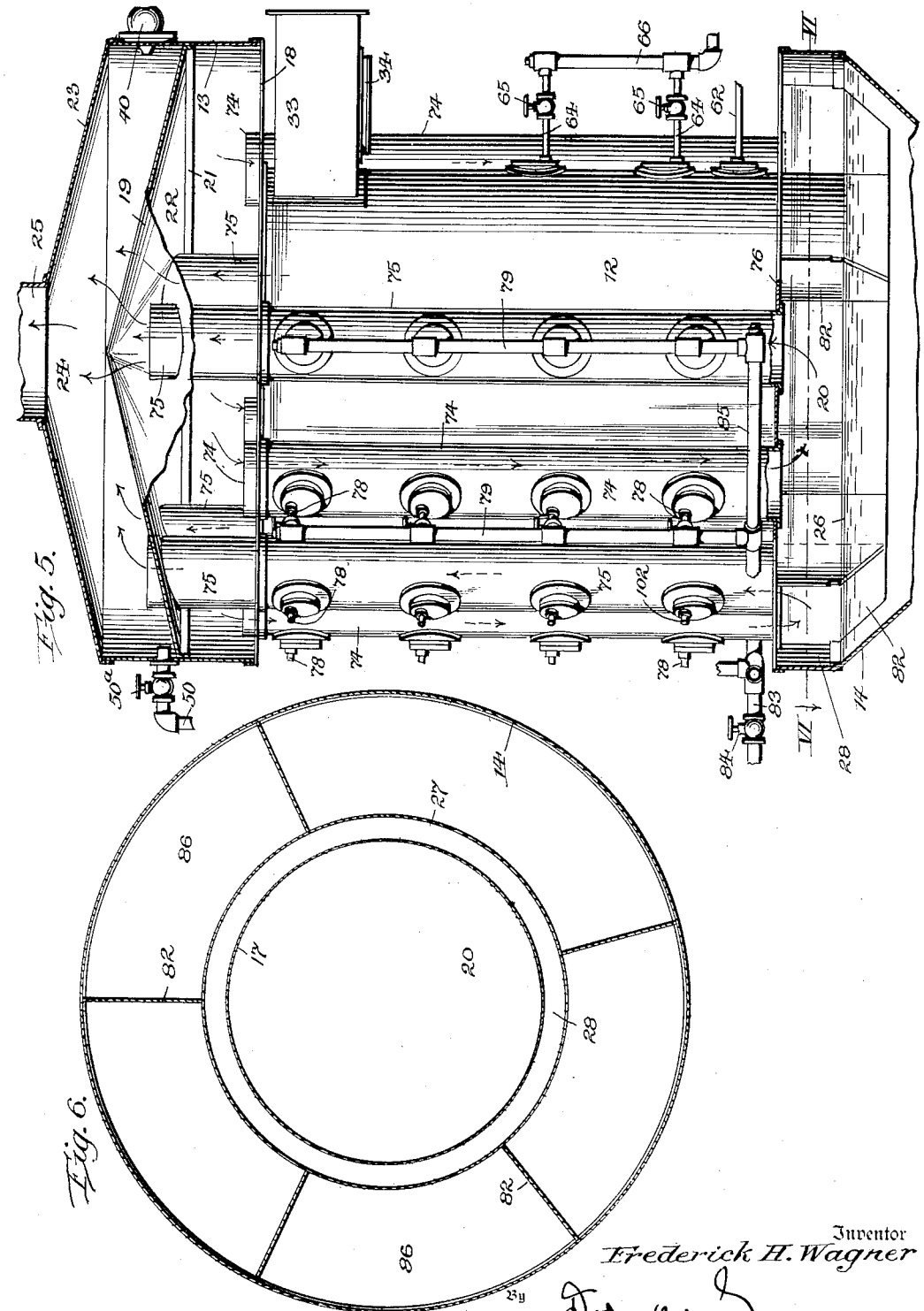
Inventor
Frederick H. Wagner
By
Attorneys.

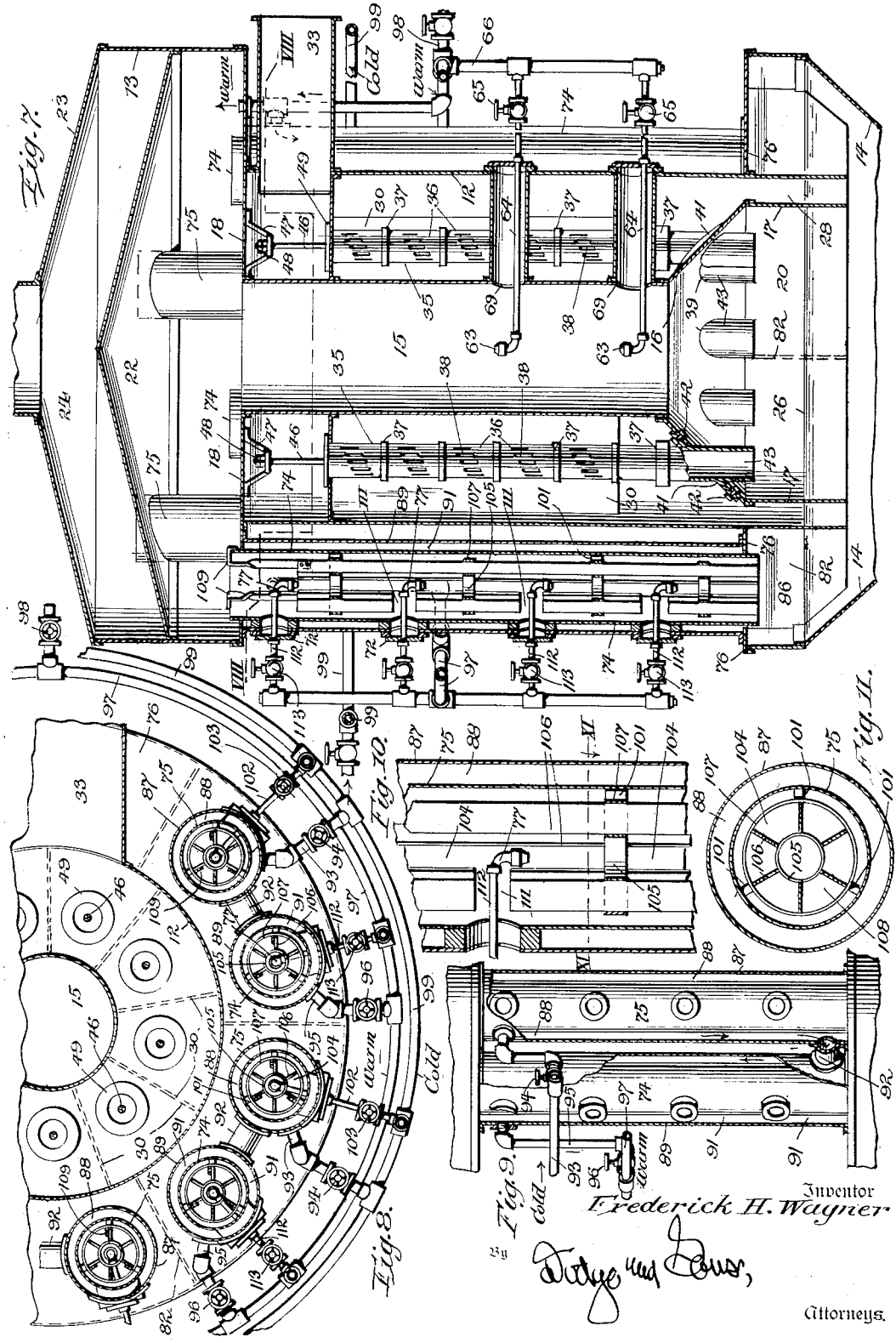

Patented Dec. 19, 1933

1,940,197

UNITED STATES PATENT OFFICE 1,940,197

GAS CLEANER

Frederick H. Wagner, Baltimore, Md.

Application July 1, 1931. Serial No. 548,209

21 Claims. (Cl. 183—31)

This invention relates to dust cleaners, and particularly to cleaners of the combination wet-and-dry type.

In a copending application, Ser. No. 548,208, filed of even date herewith, there is disclosed a dry gas cleaner wherein the dust-laden gas is introduced in large volume under pressure and is then separated into a plurality of small streams. Each of these streams passes through a spiral centrifugal dust separator by means of which the dust particles are thrown outwardly and fall into a collecting chamber, while the clean gas passes through an outlet tube to its place of use or storage.

While extractors of the type just referred to are very efficient in removing dust particles from gases, they are ineffective to remove fumes or metallic vapors therefrom. It has been found, however, that if the gas containing metallic vapors is passed through a chamber in which it is thoroughly saturated with a liquid such as water, the temperature of the gas will be lowered and the fumes or metallic vapors caused to condense. After such condensation, the metallic particles may be collected in a water bath supplied from the sprays in the saturation chamber. The clean gas, from which the fumes have been removed, may then be directed outwardly through suitable condensing tubes, so as to free it substantially from water vapor before it is allowed to escape from the cleaner.

A combination cleaner of the type described, is particularly effective in cleaning blast furnace gases and is capable of operating with high efficiency because the parts may be so arranged that heat exchange principles are utilized to avoid losses which are present in most cleaners of the prior art. For example, the gas outlet tubes may be so arranged that the heat from the outgoing gas is conducted to the incoming water, raising its temperature, and this water subsequently serves as a spray in the saturation chamber, when water at an elevated temperature is desired. In this way, the temperature of the outgoing clean gas is lowered and, at the same time, the heat removed from it is utilized to warm up the saturation spray to a temperature suitable for treating the hot gas after the dust has been removed from it.

A cleaner embodying the principles just set forth offers all of the advantages set forth in the copending application above referred to, and in addition, makes it possible to reduce the temperature of the gas while it is being cleaned, and at the same time to free it from fumes which cannot be removed by the use of centrifugal means.

One object of my invention is, therefore, to produce a unitary gas treating apparatus in which the dust is removed by centrifugal means, and the fumes are removed by saturation means, thereby avoiding the use of a separate washer.

A further object of the invention is to produce a gas cleaner in which the dust and fumes are removed while the heat in the incoming gas is utilized in operating the cleaner.

Another object of the invention is to produce a gas cleaner in which the clean gas is permanently separated from the dust, so that there is no possibility of the clean and dust-laden gases intermingling after the separation is once begun.

Further objects will appear from the following description, when read in connection with the accompanying drawings, in which—

Figure 1 is an axial sectional view of one form of gas cleaner embodying this invention;

Fig. 2 is a horizontal section on line II—II of Fig. 1;

Fig. 3 is a horizontal section on line III—III of Fig. 1;

Fig. 4 is a fragmental detail of one of the dust extractor tubes shown in Fig. 1;

Fig. 5 is a side elevation of the cleaner shown in Fig. 1, parts being broken away to show the interior chambers and tubes at the two ends of the cleaner;

Fig. 6 is a section on line VI—VI of Fig. 5;

Fig. 7 is an axial sectional view of a modification in which the gas tubes are provided with heat exchange jackets;

Fig. 8 is a fragmental sectional view on line VIII—VIII of Fig. 7;

Fig. 9 is a detailed view, partly in section, of the jacket arrangement shown in Fig. 7;

Fig. 10 is a fragmental axial sectional view of one of the spray tubes shown in Fig. 7; and Fig. 11 is a horizontal section through one of the spray tubes, the line of this section being designated XI—XI in Fig. 10.

Referring to the drawings, the reference character 12 designates an upright shell or casing having an enlarged top 13, and an inverted cone-shaped bottom 14. Centrally disposed inside of this casing is a tubular member 15 connecting the top and bottom portions of casing 12. The member 15 carries a depending flared perforated apron 16 terminating at its lower end in an annular flange 17. Member 15 is supported in the casing by a plate 18 which is attached to and cooperates with the top 13 of the casing, to form two chambers separated by a conical partition 19 secured to the wall of top 13 at 21. The space between plate 18 and partition 19 is in communication with the interior of tubular member 15 and forms, with the interior of this member, a saturation chamber designated 22. Above the plate 19 and inside of the cover 23 of top 13, is another chamber 24 which will be designated the outlet chamber, and which communicates with a gas outlet opening 25.

Under some conditions, it may be desirable to flush the chamber 24, and for this purpose a ball and socket flushing nozzle 40 may be secured to the wall of top 13. Water or other liquid may be supplied to the nozzle through a hose or pipe 40a. The flushing liquid may be drained away through a discharge pipe 50, which pipe is arranged at the lowest point in chamber 24 and is provided with a control valve 50a.

It will be apparent from an inspection of Fig. 1, that the inverted cone-shaped bottom 14 of casing 12 contains a liquid 26, and that the flange 17 of member 15 dips into this liquid so as to form a gas chamber 20 communicating with the interior of member 15. It will also be clear that the wall of casing 12 is extended downwardly to form an annular casing 27 which is coextensive with and spaced from the flange 17. As a consequence of this arrangement, a substantially annular chamber 28, which functions as a dust-collecting chamber, is formed between the outer wall of casing 12 and the tubular member 15, the lower portion of this chamber being constricted at the point where flanges 17 and 27 dip into the liquid. This arrangement is important because it prevents intermingling of the clean gas inside of the gas chamber 20 with the dust particles in chamber 28.

Secured around the tubular member 15, is a plate 29 which extends between the inside of casing wall 12 and the outside of member 15, the plate being perforated and provided with a flange 31 which contacts with the member. This plate cooperates with member 15 and wall 12 to form an annular gas inlet chamber 32, to which dust-laden gas may be supplied under pressure through a horizontal inlet 33. As here shown, the inlet 33 is provided with a manhole 34 through which access may be had to the interior of the apparatus. The plate 29 contains a plurality of spaced openings for the reception of centrifugal dust extractor tubes 35, and these tubes serve to convey gas from the inlet chamber 32 to the gas chamber 20, and to divide the incoming gas into a plurality of small streams, each of which is subjected to centrifugal action so as to separate the dust particles and throw them outwardly into dust chamber 28. These dust extractor tubes are similar to those described in the copending application referred to above, and a brief description of one of them will be sufficient for an understanding of the invention.

Each of these tubes is made up of a plurality of sections 36, each having an outer flanged portion 37 which serves to receive the small end of the section next above it. Each of these sections contains a plurality of helically arranged dust-discharge openings 38 in its outer wall, through which dust is thrown by centrifugal action into the dust chamber 28. The bottom section 43 of each of these tubes is of special construction and, although it has the extended flange 37 at the top, it is imperforate throughout and extends through openings 39 in the apron 16, and is provided with an extended flange 41 which is angularly related to the tube axis and fits against and is secured to the apron 16 by suitable means, such as rivets 42. The bottom section supports all of the sections next above it and carries within it a sectional spiral baffle member 44. Each section of this baffle member includes a central core piece 45 and a helical baffle which is integral with it. The separate members 44 are mounted on a rod 46, the top end of which rod terminates inside of a yoke 47 secured to the under side of plate 18. The rod, together with the parts carried thereby, is secured in position by nuts 48 screwed onto the rod 46 above the yoke 47. The top section of each tube 36 is modified slightly to form an extended annular flange 49 for supporting and guiding the tube in the opening through which it passes.

The dust-collecting chamber formed by the wall of casing 12 and the tubular member 15, is divided into several sections, one for each of the extractor tubes 35, by radial partition plates 30, which extend from the plate 29 to a substantial distance below the openings in the lowermost section of each extractor tube. The exact arrangement of these plates will be evident from an inspection of Figs. 1 and 3, and their function is to prevent the turbulence caused by the gas passing through these tubes under pressure, from carrying dust extracted from one tube through the openings 38 into an adjacent tube. Such action is positively prevented because each extractor tube is in a chamber by itself, and these small chambers divide the chamber 28 into sections which are completely isolated, except for their connection below the ends of the plates 30.

The lower end of bottom 14 of the casing 12 terminates in a tube 51 having a liquid discharge pipe 52 connected to it and controlled by a valve 53. Valve 53 may be manipulated to remove liquid 26 from the casing. The tube 51 is connected with a siphon 54 which inclines upwardly and leads into a closed casing 55. This casing is divided into two chambers by a partition 56, the chamber 57 to the left of this partition allowing the liquid 26 to accumulate to a certain depth before it overflows into the right hand chamber 58. The left hand chamber 57 is provided with a liquid drain 59 controlled by a valve 61. This valve may be manipulated to remove liquid from chamber 57, or it may be closed so that the liquid overflows the partition 56 and escapes through the outlet 58 to which the slurry may pass to a suitable dewatering device. If such a device is employed, the water may be returned to the apparatus and used over again as soon as the foreign particles have been removed from it. The inside of casing 55 is connected to dust-collecting chamber 53 through an equalizing pipe 62. This pipe passes through a gas-tight cover 60 in opening 70 of the wall 12. The function of this pipe is to maintain the same pressure in both the casings 12 and 55, so that the level of liquid inside of casing 14 may be regulated by the action of siphon tube 54.

The structure so far described is capable of removing the dust particles from the gas, but is not capable of lowering its temperature or removing fumes such as metallic vapors from it.

Accordingly, there is provided suitable means for saturating the gas with moisture, and then to supersaturate it so as to lower its temperature and condense the fumes, and cause them to fall in solid form into the liquid 26.

The tubular member 15 which connects the gas chamber 20 with the saturation chamber 22 is provided with a plurality of spray heads 63, to which liquid or steam is supplied through pipes 64, each controlled by a valve 65. The pipes 64 are secured to and supplied with liquid from a main supply pipe 66 having a control valve 67. The pipes 64 are led into the tubular member 15 through tubes 68, which tubes are in gas-tight relation with openings 69 in the wall of member 15, and similar openings 71 in the casing wall 12. The tubes 68 are closed at their outer ends by covers 72, through which the pipes 64 pass.

Spray heads 63 are arranged to throw a fine atomized spray in an upward direction in the tubular member 15, this being the same direction in which the clean gas from extractor tubes 35 passes from gas chamber 20. During the passage of the gas through this chamber, it becomes saturated with liquid and the parts are so arranged and adjusted that the entire volume of gas contains moisture more or less uniformly distributed through it. If the liquid supplied to this chamber is at a lower temperature than the gas coming from chamber 20, the temperature of the gas will be lowered, hence any desired effect may be obtained by suitably controlling the temperature of the liquid supplied to pipe 66. For example, the temperature of the liquid supplied to spray 63 may be so regulated that condensation may be produced inside of tubular member 15 so as to carry dust particles down into the liquid 26. Under such conditions, the gas from member 15 may pass directly to any desired place of use. It is preferred, however, to prevent condensation in the saturation chamber, and to allow the liquid pressure to aid in forcing the gas toward the outlet.

It has been assumed so far that the liquid from sprays 63 is at a temperature not greatly below that of the gas coming from chamber 20. Consequently, this gas still contains very finely divided dust particles which have not been removed by the extractor tubes 35, and also fumes in the form of metallic vapors. In order to reduce the temperature of this gas sufficiently to cause condensation of the moisture on the dust particles as nuclei, and also to reduce the temperature of the gas sufficient to condense the fumes contained therein, it is necessary to provide additional temperature reducing means and condensing means.

Outside of casing 12 and connecting the top and bottom of the casing, are a plurality of alternately disposed spray tubes 74 and condensing tubes 75. The spray tubes 74 connect the saturation chamber 22 with the chamber inside of bottom 14 of the casing and pass through perforations in the plates 18 and 76.

Disposed at spaced intervals in the tubes 74 are downwardly directed spray heads 77, to which water or other liquid may be supplied through pipes 78 connected to a common supply pipe 79. The supply of liquid to each individual spray head may be controlled by a valve 81. One wall of each of these tubes contains a series of spaced cover plates 72, of the same construction as those previously described in connection with the liquid supply pipes passing from casing 12 to tubular member 15. The pipes 74 receive the clean saturated gas from chamber 22 and direct it downwardly. The downward movement of the gas is accelerated by the piston-like action of the spray from spray heads 77, and in its passage downwardly the gas becomes further saturated with moisture, its temperature is further reduced, and dust particles collect moisture tending to cause these particles to be carried into the liquid 26 at the bottom of the tubes. If the temperature of the liquid spray is low enough, condensation of the fumes in the gas will take place, thereby causing the vapors to condense and fall into the liquid along with the liquid globules formed about the dust particles.

The condensing tubes 75 pass through partition 19 and plates 18 and 76, and connect the outlet chamber 24 with the space below adjacent spray tubes 74. Tubes 75 contain spray heads 77 arranged in similar manner to those in tubes 74, and they are supplied with cold water from the same source.

The tubes 74 and 75 are arranged in alternating relation and in pairs, as will be evident from an inspection of Fig. 3 of the drawings. These pairs of tubes have their lower ends connected above the liquid 26 in bottom 14 by chambers 86 between seal plates 82, extending from the outer wall of casing bottom 14 to the flange 27 of annular wall 12, and these plates dip into the liquid 26. Consequently, gas passing down one of the tubes 74 can only pass through a chamber 86, over the liquid 26 and into the adjacent tube 75, thence upwardly under pressure from the constantly incoming gas, and likewise because of the action of the spray heads 77. These pairs of tubes 74 and 75 form tortuous passages connecting saturation chamber 22 with outlet chamber 24, and it is in the tubes 75 that the major portion of the condensation of the fume and water globules containing dust particles takes place. This condensed material falls into the liquid 26 in the chambers 86, and mingles with the other dust particles collected in this liquid from the dust-collecting chamber 28 and the gas chamber 20.

It will be observed from Figs. 2 and 3, that a common liquid spray pipe 83, controlled by a valve 84, carries liquid to all of pipes 79 and 78 through an annular tube 85 extending entirely around the cleaner. The pipes 79, together with their branch pipes 78, are connected to the tube 85 at spaced intervals, corresponding to the location of the tubes 74 and 75. By the interposition of valves as shown, it is possible to control the amount of liquid supplied to these tubes in any desired manner. For example, all of these heads may be supplied with liquid simultaneously, or one or more of them may be cut out entirely, or the flow of liquid suitably regulated. If it is desired to supply cold water both to the saturation chamber and to the sprays of tubes 74 and 75, the inlet pipe 66 may be connected to the same source as that which supplies liquid to pipe 83, or pipe 66 may be connected to the annular pipe 85.

The operation of the cleaner as a whole is as follows: It will be assumed that the cleaner is to be used in extracting dust and fume from smelting furnace gas, and that this gas under pressure is supplied to the inlet tube 33. The entire volume will pass around through the chamber 32 and will divide into a plurality of small streams, each of which will pass down through one of the extractor tubes 35, where it will be subjected to rapid whirling action, thereby removing a large percentage of the dust particles by centrifugal action, and expelling them through openings 38 into the dust-collecting chamber 28 where they fall into the liquid 26 to be carried away. The gas containing a small percentage of very fine dust particles will then enter the clean gas chamber 20 above the liquid 26, and pass upwardly through the tube 15 where it will comingle with the liquid spray from spray heads 63 and become saturated with moisture by the time it reaches the saturation chamber 22.

From the chamber 22 the whole volume of gas is again subdivided into a series of independent streams which divide and pass down through spray tubes 74, wherein each gas stream is further lowered in temperature. The small dust particles collect moisture to form globules, some of which may be carried into the liquid 26, while others will be carried up through tubes 75. The lowering of the temperature of the gas in these tubes will cause the fumes or metallic vapor to be condensed, so that the condensed particles will fall by gravity into the liquid 26 where they are carried away. The clean gas, containing moisture but substantially free from dust and fumes, will escape into the outlet chamber 24, whence it is directed from outlet opening 25 to any suitable place of use.

The liquid in chamber 26 is constantly replaced by liquid escaping from sprays 63 and 77, and passes away together with the dissolved dirt and metallic particles in the form of slurry through a siphon tube 54 into chamber 57, and thence through drain pipe 59 or to a de-watering device connected with pipe 58. The siphon tube 54 is so arranged that the depth of liquid 26 remains constant in spite of the continuous inflow of liquid from the sprays above, and the drain valve 61 may be so arranged that the slurry escaping from chamber 57 will cause the level of liquid 26 to be maintained constant.

It will be evident that steam may be injected into the chamber 15 through spray heads 63, if desired. Likewise, either hot or cold water may be supplied to the sprays 63, as well as to the sprays 77, and the temperature so adjusted that the gas delivered to the outlet chamber 24 is in any desired condition. The factors will vary, of course, in accordance with the condition of the gas which enters the inlet 33, as to temperature, pressure, dust content and fume content.

The apparatus which has just been described is particularly effective in removing dust and fume from gases, but under some conditions it may be desirable to lower the temperature of the clean gas by a substantial amount, and this could not be accomplished by the apparatus just described, without the use of refrigerated liquid in the sprays. If the liquid supplied to chamber 15 from sprays 63 is to be warmed, the heat removed from the outgoing gas can be used for warming it, and when this is desired the apparatus is arranged in accordance with the showing of Figs. 7 to 11.

Referring now to Fig. 7, the apparatus there shown is the same as that which has just been described, with the exception that the arrangement of the liquid supply pipes is changed, and the spray and condenser tubes are provided with heat exchange jackets in which incoming liquid is placed in heat exchanging relation with the outgoing gas from the cleaner, and this liquid is in turn supplied to spray heads 63 inside of member 15.

Each condenser tube 75 is surrounded by a wall or jacket 87, placed in spaced relation to the tube and forming outside of it an elongated annular chamber 88. The ends of this chamber are in liquid-tight relation with the plates 18 and 76. Each of the spray tubes 74 is likewise provided with a jacket 89 in spaced relation to the tube and forming therewith an annular chamber 91. Inasmuch as all of the jackets are arranged similarly for each pair of spray and condenser tubes, a description of one will be sufficient for all.

The two chambers 88 and 91 are connected at the bottom by a tube 92 which is in liquid-tight relation with the two jackets. Cold water may be supplied from a pipe 93 to the jacket 88, the connection being made near the top of the jacket as shown in Fig. 9, and the supply of water being controlled by a suitable valve 94. The cold water will pass downwardly inside of jacket 88, at the same time circulating around it and then through tube 92 into the bottom of jacket 91. During its passage through these two jackets, the water becomes warmed by the heat exchange between the hot gases passing through the tubes 74 and 75, and the water in chambers 88 and 91, so that the temperature of the water is elevated. The water in the chamber 91 passes upwardly both because of its pressure and because of its temperature.

From the top of chamber 91 the hot water escapes through an outflow pipe 95 controlled by a valve 96 and connected to a common annular pipe 97, which extends around the cleaner and connects to supply pipe 66 through which this water is supplied to sprays 63, under control of valves 65. An auxiliary supply pipe 98 is shown, through which hot water may be supplied directly to pipe 66 from an outside source. Cold water is supplied to the various inlet pipes 93 from a common supply pipe 99, and this supply is controlled by valves 94.

In this form of apparatus, the condenser tubes 75 are provided with cold water sprays, as shown in Fig. 8, while the spray tubes 74 are supplied with hot water through pipes 112 containing valves 113. The cold water spray pipe 99 has branch supply pipes 102 controlled by valves 103, through which cold water is supplied to the spray heads inside of the tubes 75.

It has been found that the saturation of the gas and its condensation is materially improved if the gas is divided into a large number of streams of small cross section, and for this reason both the tubes 74 and 75 are fitted with diffusing members 104.

The members 104, as best shown in Figs. 7, 10 and 11, each comprise a plurality of inner rings 105 and outer rings 107, disposed in spaced relation and connected together by radial ribs 106 extending from the top to the bottom of each tube and rigidly secured to the rings 105 and 107. The arrangement of these parts is such that the ribs 106 form elongated sector-shaped chambers 108, extending substantially from the top to the bottom of each tube, but connected together at their inner ends adjacent the annular space defined by inner rings 105. Each of these cage-like members is secured in place within its respective tube by three supporting brackets 109, which extend over and hook around the top of the tube in which it is supported. As here shown, the ribs 106 are interrupted at the points 111 where liquid supply pipes 78 pass through the tube walls and the associated jackets 89, this interruption being such as to facilitate assembly of the spray diffuser inside of its tube, and to permit it to be rotated through about 120° if desired. The members 104 are centered within their respective tubes by centering blocks 101 secured to outer rings 107 at spaced intervals.

Having described the structural parts of the jacketing apparatus, its operation will now be described briefly. Hot gas saturated with moisture passes from the saturation chamber 22 into the spray tubes 74 where it travels downwardly, both because of its pressure and because of the piston-like action of the sprays 77. The diffusing cages operate to separate this gas into several small streams in which intermingling of the liquid and the gas is enhanced to a high degree. This separation causes condensation of the fumes in the gas, as well as formation of liquid globules around the tiny dust particles still present in the gas. From the spray tubes 74 the moisture-laden gas passes through chambers 86 and thence upwardly through tubes 75 wherein the gas is further washed, its temperature further lowered, and condensation further carried on. From the tubes 75 the clean washed gas, substantially free from dust particles, passes into the outlet chamber 24 for delivery to its place of use.

When the gas enters the tube 74, it is at a very high temperature and gives off a considerable portion of its heat through the walls of the spray tubes 74 into the cold water in the chambers 88. Heat exchange takes place while the gas is passing through the tubes 74, and also while it is passing through the tubes 75. In the latter tubes, a substantial portion of the heat remaining in the gas is transferred to the water in chambers 91, so that the water flowing from these chambers is at a temperature substantially higher than that at which it enters the chambers 88. The hot water from chambers 91 passes through pipe 97 and then to the pipe 66 and to the saturating sprays 63, at a temperature substantially higher than that at which it is introduced into chambers 88, and approximating the temperature of the gas supplied to the member 15 from the dust extractor tubes.

By arranging the parts in this manner, the heat in the hot gases is utilized to warm up the water supplied to the saturation chamber, hence this heat need not be supplied from an external source. By subdividing the spray in the spray and condensing tubes into small streams, the spray acts upon very small volumes of gas so as to facilitate condensation of the water particles, and of the fume.

Gas cleaners embodying the principles just described show very marked efficiency over washers of the prior art, particularly those of the "Ballo" type, in which external liquid heating means must be used and the liquid from such means must be pumped into the cleaner. Cleaners embodying this invention not only avoid the losses of power and of heat which take place in auxiliary pumping and heating apparatus, but they provide a unitary self-contained structure which can take dust-laden gases at high temperatures, wash them thoroughly, removing both the dust particles and the fume, and lowering their temperature so that at the delivery outlet the gas is clean, cool and almost entirely free of dust particles of all sizes.

It is also to be understood that in the broader aspect of the invention, means other than the centrifugal type for separating the dust, such for instance as bags or other filtering means, may be interposed between the gas inlet chamber and the saturation chamber. The centrifugal type, however, is preferred.

Although only two forms of gas cleaners embodying this invention have been described, it will be obvious that changes may be made in the details within the terms of the appended claims without departing from the spirit and scope of the invention.

What is claimed is:

1. A gas cleaner comprising a gas inlet chamber and a saturation chamber; a plurality of separate and distinct centrifugal dust-separating devices between and in communication with the outlet of one and the inlet of the other of said chambers; means for supplying moisture in the form of water vapor to said saturation chamber; and means outside of said saturation chamber for condensing the water vapor about dust particles in the gas as nuclei.

2. A gas cleaner comprising a hollow upright casing containing gas inlet and outlet chambers and a dust-collecting chamber; a plurality of centrifugal dust extractors connected to said inlet chamber and arranged to discharge dust into said dust-collecting chamber; means for saturating the gas from said extractors with moisture; conduits for conducting saturated gas to the outlet chamber, and means in said conduits for supersaturating the gas to cause condensation of the moisture about the dust particles as nuclei.

3. A gas cleaner comprising a hollow casing containing gas inlet and outlet chambers and a saturation chamber; a plurality of separate and distinct centrifugal dust-separating devices connecting the inlet and saturation chambers; and spray and condensing conduits arranged to from tortuous passageways connecting the saturation chamber with the outlet chamber.

4. A gas cleaner comprising gas inlet and outlet chambers and a dust-collecting chamber; a plurality of centrifugal dust extractors connected to said inlet and arranged to discharge dust into said dust-collecting chamber; means for saturating the gas from said extractors with moisture; and tortuous passageways for conducting gas from the saturating means to the outlet chamber.

5. A gas cleaner comprising gas inlet, outlet and saturation chambers and a dust-collecting chamber; a plurality of centrifugal dust-separating members between and in communication with both the inlet and saturation chambers, said members being arranged to discharge dust into the dust-collecting chamber; and alternately disposed spray and condensing conduits connecting the saturation chamber with the outlet chamber.

6. A gas cleaner comprising a hollow upright casing having a centrally disposed tube therein; means for spraying moisture into said tube; a plurality of centrifugal dust-extractor tubes disposed around said central tube, the discharge ends of said extractor tubes communicating with the central tube; means for directing dust-laden gas under pressure into said extractor tubes; spray tubes within said casing and arranged to receive saturated gas from said central tube;

condenser tubes for receiving gas discharged from the spray tubes; and a collecting chamber disposed beneath said tubes to receive the dust discharged from the extractor tubes and the moisture from the central tube and the spray tubes.

7. A gas cleaner comprising a hollow casing containing gas inlet, outlet and saturation chambers; the outlet and saturation chambers being in vertical superposed relation to each other; a plurality of centrifugal dust-extractor tubes connecting the inlet and saturation chambers; means for supplying moisture to the saturation chamber; a set of spray tubes and a set of condensing tubes disposed in said casing with their lower ends in communication with each other, the top ends of the tubes of one set connecting with the saturation chamber, and those of the other set connecting with the outlet chamber; and a liquid chamber below all of said tubes for receiving the dust discharged from the extractor tubes and the liquid from the spray tubes and the saturation chamber.

8. A gas cleaner comprising a hollow casing containing gas inlet, outlet and saturation chambers; the outlet and saturation chambers being in vertical superposed relation to each other; a plurality of centrifugal dust-extractor tubes connecting the inlet and saturation chambers; means for supplying moisture to the saturation chamber; a set of spray tubes and a set of condensing tubes disposed in said casing with their lower ends in communication with each other, the top ends of the spray tubes connecting with the saturation chamber, and those of the condensing tubes connecting with the outlet chamber; and a liquid and dust collecting bath in said casing below said tubes and chambers.

9. A gas cleaner comprising a hollow upright casing having a centrally disposed tube therein; means for spraying moisture into said tube; a plurality of centrifugal dust-extractor tubes disposed around said central tube, said tubes communicating with the central tube; means for directing dust-laden gas under pressure into said extractor tubes; a plurality of vertically disposed tubes in said casing each containing a liquid spray and having their top ends in communication with the central tube; a plurality of condensing tubes disposed in alternating relation with the spray tubes, and having their bottom ends in communication with the spray tubes; and a collecting bath disposed beneath said tubes.

10. A gas cleaner comprising an upright outer casing having an inverted cone-shaped bottom containing liquid; a tubular member centrally disposed in said casing and having a depending annular flange extending into said liquid; an outer flange in said casing surrounding and spaced from said tubular member and depending into said liquid; and a plurality of radial plates disposed in spaced vertical planes and connecting the outer casing with said outer flange, all of said plates extending into said liquid to form separate chambers between them.

11. A gas cleaner comprising an upright outer casing having an inverted cone-shaped bottom containing liquid; a tubular member centrally disposed in said casing and having a depending annular flange extending into said liquid; an outer flange surrounding and spaced from said tubular member and depending into said liquid; a plurality of dust-extractor tubes between said tubular member and said casing; means for supplying dust-laden gas to said tubes; radial plates disposed in spaced vertical planes and connecting the outer casing with said outer flange; and sets of gas discharge tubes between said outer casing and outer flange, the tubes of each set being connected at their bottoms through the space defined by adjacent plates.

12. A gas cleaner comprising an upright casing having a flared bottom; a liquid in said bottom; a tubular member in said casing, having its lower end extending into said liquid; a gas inlet chamber to which dust-laden gas is supplied under pressure; a plurality of centrifugal dust-extractor tubes connecting said inlet chamber with the gas chamber formed above said liquid where said tubular member extends into it; and means for supplying moisture to the clean gas passing through said tubular member from said gas chamber.

13. A gas cleaner comprising an upright casing having a flared bottom; a liquid in said bottom; a tubular member in said casing, having its lower end extending into said liquid; a gas inlet chamber to which dust-laden gas is supplied under pressure; a plurality of centrifugal dust-extractor tubes connecting said inlet chamber with the gas chamber formed above said liquid where said tubular member extends into it; means for supplying moisture to the clean gas passing through said tubular member from said gas chamber; and an annular flange disposed around and spaced from said tubular member, said flange extending into said liquid and cooperating with the casing to form a chamber in which dust from the extractor tubes may enter said liquid in separated relation to the clean gas in said tubular member.

14. A gas cleaner comprising an upright casing having a flared bottom; a liquid in said bottom; a tubular member in said casing, having its lower end extending into said liquid; a gas inlet chamber to which dust-laden gas is supplied under pressure; a plurality of centrifugal dust extractor tubes connecting said inlet chamber with the gas chamber formed above said liquid where said tubular member extends into it; an annular depending flange carried by said casing, surrounding the extractor tubes and extending into said liquid to form a dust-collecting chamber; an outlet chamber in the casing; sets of spray and condenser tubes connecting the interior of said tubular member with said outlet chamber; and means extending into said liquid for separating each set of spray and condenser tubes from the other sets.

15. A gas cleaner comprising a casing containing an inlet through which hot dust-laden gas is introduced into said casing under pressure; a gas saturation chamber; means for separating dust from said gas and conducting the gas to the saturation chamber; an outlet for clean gas; a liquid chamber in heat-exchanging relation with said outlet; means for supplying liquid to said liquid chamber at a temperature below that of the outgoing gas; means for supplying the hot liquid from said liquid chamber to said saturation chamber, and means outside of said chamber for supersaturating the outgoing gas to condense the moisture therein about the dust particles as nuclei.

16. A gas cleaner comprising a hollow upright casing containing gas inlet and outlet chambers and a dust-collecting chamber; dust extractors connected to said inlet chamber and arranged to discharge dust into said dust-collecting chamber; means for saturating the gas from said extractors with moisture; conduits for conducting hot saturated gas to the outlet chamber; means for placing liquid at a temperature below that of the outgoing gas in heat-exchanging relation to said conduits; means for delivering such liquid to the saturation chamber after it has been heated by the outgoing gas, and means outside of said saturation chamber for supersaturating the outgoing gas to condense the moisture therein about the dust particles as nuclei.

17. A gas cleaner comprising a hollow casing containing gas inlet and outlet chambers and a saturation chamber; centrifugal dust-separating means connecting the inlet and saturation chambers; spray and condensing conduits arranged to form tortuous passageways connecting the saturation chamber with the outlet chamber; liquid chambers surrounding said conduits in heat-exchanging relation thereto; means for supplying liquid to said liquid chambers at a temperature below that of the outgoing gas; and means for delivering such liquid to the saturation chamber after its temperature has been raised by the heat in the outgoing gas.

18. A gas cleaner comprising a hollow upright casing containing gas inlet and outlet chambers and a dust-collecting chamber; a plurality of centrifugal dust extractors connected to said inlet and arranged to discharge dust into said dust-collecting chamber; means for saturating the gas from said extractors with moisture; tortuous passageways for conducting gas from the saturating means to the outlet chamber; means for placing water at a temperature below that of the outgoing gas in said passageways into heat-exchanging relation with such gas; and means delivering the heated water to the gas saturating means.

19. A gas cleaner comprising an upright casing having a flared bottom; a liquid in said bottom; a tubular member in said casing, having its lower end extending into said liquid; a gas inlet chamber to which dust-laden gas is supplied under pressure; a plurality of centrifugal dust-extractor tubes connecting said inlet chamber with the gas chamber formed above said liquid where said tubular member extends into it; means for placing a cold liquid in heat-exchanging relation to the outgoing hot gas from said tubular member; and means for delivering said liquid at an elevated temperature to the tubular member and spraying it into contact with the clean gas from the gas chamber.

20. A gas cleaner comprising a hollow upright casing containing gas inlet and outlet chambers and a dust-collecting chamber; dust extractors connected to said inlet chamber and arranged to discharge dust into said dust-collecting chamber; conduits for delivering clean hot gas from said extractors to said outlet chamber; liquid jackets surrounding said conduits in heat-exchanging relation thereto; means for supplying liquid to said jackets at a temperature below that of the gas passing through such conduits; and means for delivering and spraying the heated liquid into the clean gas.

21. A gas cleaner comprising a gas inlet chamber and a saturation chamber; dry dust-separating means forming at least a portion of the connection between said chambers and comprising a plurality of separated devices, each operating on a small gas stream; means for supplying moisture in the form of water vapor to said saturation chamber, to raise the dew-point of the gas contained therein; and means for cooling the gas to produce super-saturation and condensation of the vapor about the dust particles as nuclei.

FREDERICK H. WAGNER.